United States Patent Office 3,471,562
Patented Oct. 7, 1969

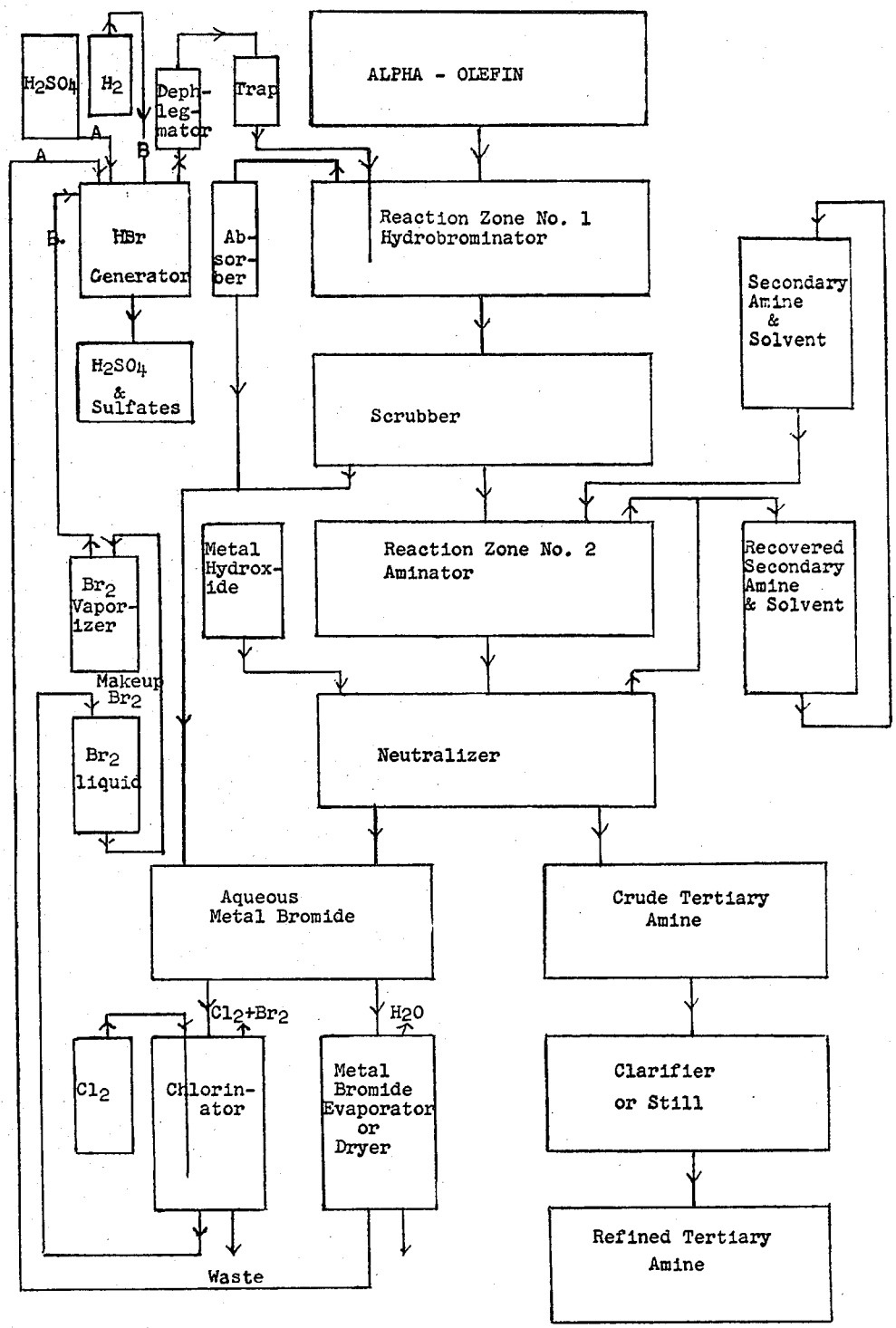

3,471,562
PREPARATION OF TERTIARY AMINES
Reginald L. Wakeman, Philadelphia, Pa., and Edward Griffin Shay, Belle Mead, N.J., assignors to Millmaster Onyx Corporation, New York, N.Y., a corporation of New York
Filed Aug. 17, 1965, Ser. No. 480,394
Int. Cl. C07c 85/00
U.S. Cl. 260—583
5 Claims

ABSTRACT OF THE DISCLOSURE

A process for making long chain, unbranched, aliphatic tertiary amines which comprises the steps of reacting a straight chain alpha olefin having 6 to 24 carbon atoms with hydrogen bromide at a temperature of about 0° C., or below, to form 1-bromo alkane, reacting the 1-bromo alkane, in liquid phase, with an excess of alkyl amine to form a tertiary amine hydrobromide, treating the tertiary amine hydrobromide with a metal hydroxide solution to liberate the free tertiary amine and to form bromide salts, producing hydrogen bromide from the bromide salts, and then recycling the hydrogen bromide to react with additional straight chain alpha olefins of the above type.

---

The object of the present invention is the preparation of long chain unbranched aliphatic tertiary amines of low cost.

Tertiary amines which possess useful and valuable properties are well known to the art. They are, however, rather costly, being usually prepared from naturally occurring fatty alcohols such as are present in spermaceti and the like, or otherwise from fatty acids or their esters by reduction, as by hydrogenation. Methods well known to the art for preparing the amines consist, in general, of such processes as converting the fatty alcohols to their halides, followed by reaction of these halides with secondary amines to form tertiary amines as their hydrohalides from which they can be recovered by treatment with alkali solution; or by such stepwise processes as the saponification of naturally occurring fats with ammonia; the dehydration of the ammonium soaps to the amides; the further dehydration of the amides to the corresponding nitriles; followed by hydrogenation to produce mixtures of mainly primary and secondary plus some tertiary long chain amines which may be separated by fractional distillation into suitable fractions, one of which is the preferred primary amine; this in turn is followed by alkylation, as by means of formaldehyde and formic acid by a modified Mannich reaction; or by reaction with an alkyl halide such as methyl chloride to yield tertiary amine hydrohalides from which the free amines can be obtained by adding a solution of caustic alkali. By this means are obtained tertiary amines containing one long hydrocarbon radical plus two short radicals such as methyl, along with more or less tertiary amine containing two long chain and one short chain radicals.

These tertiary amines which may be either mixtures containing a wide series of homologous amines, or as the result of distillation a narrower range of such homologs, or where desired a segregated amine of a definite chain length, may then be further processed by reacting them under suitable conditions as, for example, with an oxidizing agent such as hydrogen peroxide, an organic peroxide, or ozone and the like, to produce amine oxides. Such oxidation processes are well known to the art and are in use for the manufacture of certain surface active agents of commercial value. The tertiary amines may also be processed by treating them with alkylating agents such as methyl chloride, ethyl bromide, benzyl chloride, dimethyl sulfate and the like, in which case quaternary ammonium salts are formed. These compounds are valuable articles of commerce with a wide range of applications, including such uses as sanitization and disinfection, fabric softening and the prevention of the accumulation of static electric charges. The tertiary amines may also be used to prepare amphoteric surface active agents of the betaine type as, for example, by reaction with chloro acetic acid or its salts and the like. Other uses for these fatty tertiary amines will be readily apparent to those skilled in the art.

These operations, because of their complexity, are necessarily costly. Since the raw materials either naturally occurring or synthesized are also relatively expensive, the end products often have been of limited commercial applicability, solely for economic reasons.

This invention proposes to reduce these costs substantially by employing materials of low cost; namely, straight chain alpha olefins obtained, for example, from the cracking of waxes, or derived synthetically from the condensation of ethylene as, for example, by the Ziegler process, or by other methods now in commercial use. The preferred range of chain lengths for the synthesis of tertiary amines of wide commercial applicability is from 6 to 24 carbon atoms.

In addition to the mono-tertiary amines of this invention, di-tertiary amines may also be prepared in the same manner from alpha-omega di-olefins.

Straight chain olefins are to be preferred because the surface active properties of branched chain compounds are inferior for a given molecular weight to those of their straight chain isomers. Alpha olefins are to be preferred because substitution in the 1-position yields more stable and more effective products.

It is therefore desirable to employ the aforesaid straight chain olefins, although up to about 20% of branched chain compounds or compounds substituted in other than the 1-position may be tolerated.

In the first stage of the process of this invention, the olefins are reacted with anhydrous hydrogen bromide under conditions suitable for the formation of 1-bromo-alkanes, for example, in the presence of an initiator such as an organic peroxide and at low temperatures, or by irradiation. Since bromine and its derivatives are costly, it is necessary to recover and recycle essentially all of the hydrogen bromide employed. The process described herein accomplishes this purpose, as will appear hereinafter. As will also appear, the reaction conditions have been selected to produce essentially only the 1-bromo-alkanes.

The alkyl bromides so obtained are then converted into suitable tertiary amines as, for example, the alkyl dimethyl amines, by reacting them under pressure with an excess of dimethyl amine at temperatures ranging from 100° to 250° C., but preferably at 100° to 150° C. over a period of from 1 to 10 hours until no further reaction occurs; this point may be determined by argentometric titration. Preferably a quantity of a polar solvent is included in the reaction mixture to increase the reaction rate.

On completion of reaction, the unreacted excess of dimethyl amine or other amine used in the process is recovered for reuse by distillation and water is added to dissolve the tertiary amine hydrobromide formed, with or without the addition of alcohol or the like to facilitate clear separation.

The amine hydrobromide solution is removed and upon addition of the required amount of alkali to liberate the free amine from its salt, the product separates as an oily layer. This may be clarified as by filtration to remove gross dirt, and it may be dried as by heating to drive off the small amount of dissolved or dispersed water, or it may be used in its crude form. For the sake of good color, it is desirable to rid it of such foreign matter.

The crude tertiary amine may be rectified by distillation to remove small amounts of low-boiling material and the still bottoms if an especially pure amine is desired; or it may be fractionally distilled to obtain amines of narrow range chain length.

The drawing, FIGURE 1, illustrates a flow chart embodying the novel features of the process. This chart illustrates graphically the sequence of steps of the process in producing straight chain alkyl tertiary amines, starting with straight chain alpha olefins preferably having from 6 to 24 carbon atoms, through the addition of HBr, the reaction of the alkyl bromide formed with a suitable secondary amine to form a tertiary amine hydrobromide; the recovery of the excess aminating agent; the removal and recovery of the combined hydrobromic acid; and the regeneration of hydrogen bromide.

The flow chart indicates how hydrogen bromide is prepared and introduced into a reactor where it reacts with the olefin. It also indicates how the small amount of excess or effluent HBr gas is trapped and removed for recycling. The chart also illustrates how the alkyl bromide may be washed to remove free or dissolved or occluded HBr to be recycled.

It further illustrates how the alkyl bromide so formed is introduced into a second reactor where it is reacted with a secondary amine, preferably in the presence of a polar solvent, desirably a mutual solvent for the alkyl bromide and the secondary amine. The chart also shows how the unreacted excess secondary amine along with the solvent is distilled from the reaction zone, and how the amine hydrobromide is then converted to free amine and to aqueous inorganic bromide salt by the addition of caustic alkali; from which mixture a further quantity of secondary amine may be distilled and recovered and added to the reaction zone fraction to be reinforced and recycled. The flow chart further shows how the aqueous and oily phases are separated so that the tertiary amine product may be clarified, dried or distilled to the degree of purity desired. It also shows how the inorganic salt layer may be tapped off into either of alternative vessels, to be concentrated to a liquor or slurry, or dried to solid salt; or otherwise, to be treated with chlorine gas to yield liquid bromine and by-product inorganic chloride.

Finally, the chart illustrates how the recovered combined bromide fractions are treated to regenerate anhydrous hydrogen bromide gas; in the first case by reacting the inorganic bromide salt with sulfuric acid and cleaning the generated hydrogen bromide gas; or in the second case by burning vaporized bromine together with hydrogen gas to form anhydrous hydrogen bromide, in apparatus which is known to the art and which is commercially available. In either case, the regeneration is conducted with a minimum of loss and consequently with a negligible expenditure for hydrogen bromide except for the cost of processing, as well as with a minimum of nuisance from corrosive fumes and objectionable waste residues.

The hydrobromination process is suited to batchwise methods, and also to continuous operation by means of suitable apparatus.

The following examples illustrate in greater detail the successive steps of the process of this invention.

Example I

A closed, agitated and jacketed glass-lined 20 gallon reactor was fitted with a sparger, and also with a vent pipe connected to a bubbler and an absorber containing caustic soda solution, for trapping any escaping HBr gas.

The reactor was charged with 61.5 pounds of a commercially obtained mixture of alpha olefins consisting of 75% of 1-tetradecene and 25% of 1-hexadecene, plus 0.05 pound of a 60% solution of methyl ethyl ketone peroxide in an inert solvent. The mixture was cooled to —5° C. and a slow stream of freshly generated anhydrous hydrogen bromide was bubbled through it, until a rise in temperature indicated the inception of exothermic hydrobromination.

Thereafter, hydrogen bromide was fed in as fast as possible while maintaining a reaction temperature of about —3° C. by circulating a refrigerant through the jacket of the kettle.

After two hours, the reaction rate diminished, and the flow of HBr gas was reduced until only a trace of it escaped, to be trapped in the absorber.

The reaction was continued for two hours longer, when no more HBr appeared to be absorbed, and the specific gravity of the charge had increased from 0.770 to 1.013.

A sample was washed and dried and assayed by titration with $KBr-KBrO_3$ mixture, as described in "The Estimation of Unsaturation Content of Petroleum Products" by A. W. Francis in I.E.C., 18 (8), pp. 821–822.

Less than 0.1% of residual olefin was found.

The alkyl bromide product was washed free of acid and dried. The washings were combined with the trapped HBr from the effluent absorber and set aside for recovery and reuse.

The product amounted to 86 pounds, or essentially the theoretical yield. It was assayed by saponification with alcoholic potash during 5 hours at the reflux; and also by reaction with a secondary amine to form a tertiary amine hydrobomide, followed by argentometric titration. Both methods indicated more than 98.5% of conversion from olefin to bromide of which about 90% was a mixture of 1-bromotetradecane and 1-bromohexadecane.

Example II

Using the same procedure as in Example I, 1-hexene, 1-octene, 1-decene, 1-dodecene; a mixture of 1-hexadecene and 1-octadecene; a broad band $C_{12}$ to $C_{20}$ mixture; a petroleum derived mixture of alpha olefins ranging from $C_{11}$ to $C_{14}$; and alpha olefins derived from the dehydration of primary alcohols of $C_{20}$ to $C_{24}$ chain length; were all successively reacted to prepare the corresponding bromides in similar yield and quality.

In the case of 1-hexadecene and the higher homologs, the temperature was allowed to rise towards the end to prevent solidification of the reaction mass.

Example III

The process according to Example I was carried out, substituting for methyl ethyl ketone peroxide, catalytic amounts of benzoyl peroxide.

The corresponding bromides were obtained in high yield and quantity from the olefins used in Examples I and II.

Example IV

One mol of the $C_{14}$ to $C_{16}$ alkyl bromides of Example I and three mols of a 25 to 30% solution of dimethyl amine in isopropanol were charged into a pressure reactor and heated under agitation at 100° to 110° C. for a period of five hours until reaction to alkyl dimethyl amine hydrobromide was complete.

The excess of dimethyl amine and isopropanol was distilled off. Caustic soda solution in slight excess was added to the residue and the remaining excess dimethyl amine was distilled off.

The recovery of unreacted dimethyl amine and isopropanol amounted to 90%. It was set aside for recycling after fortification with make up amine and alcohol.

The brine was tapped off and combined with the bromide effluents and washes of Example I for recovery of hydrogen bromide as described in Examples VII and VIII below. The mixed bromides were assayed by titration and found to contain about 98% of the hydrogen bromide used in the hydrobromination.

The alkyl dimethyl amine product was washed and clarified. The yield was essentially the theoretical.

On distillation in vacuo at 7 mm. pressure, and to a top temperature of 190° to 200° C., after removing a small forerun, a refined amine of high quality was obtained in overall yield of 82%, or weight for weight of the starting olefin.

Example V

The process of Example IV was carried out in the same way except that instead of caustic soda solution, a slurry of aqueous calcium hydroxide or slaked lime was used as the alkali for neutralization.

The calcium bromide brine was filtered and reserved for recovery of anhydrous HBr.

The tertiary amine product was identical with that of Example IV.

Example VI

The alkyl bromides of Example III were reacted with dimethyl amine as in Example IV, to obtain the corresponding crude alkyl dimethyl amines in essentially the theoretical yield and high quality.

Refined amines were obtained after vacuum distillation as described in Example IV.

The brines were collected and used to regenerate hydrogen bromide gas for the next run.

Example VII

The brine and other bromide liquors from Example IV were combined and charged into a chlorinator, wherein chlorine gas was bubbled through to liberate liquid bromine, which settled to the bottom, and to form sodium chloride. The bromine was tapped off, and the brine was further treated by a degree of steam distillation, whereby most of the dissolved bromine was recovered, the dissolved chlorine being removed in the first runnings. The combined bromine layers were dried and stored.

Proportional amounts of bromine vaporized therefrom and of hydrogen were fed to a combustion chamber or furnace wherein they burned to form anhydrous hydrogen bromide, at a rate variable at will for the process of hydrobromination as described in preceding examples.

Overall recovery of hydrogen bromide was about 95% for the entire cycle. Additional make up bromine was burned in the same manner to provide the necessary amount of hydrogen bromide for complete hydrobromination.

Calcium or potassium bromide brine may be regenerated in the same manner.

Example VIII

The calcium bromide brine and washings from the process according to Example V was concentrated by evaporation to 70% strength. It contained about 98% of the bromine used in the process.

The concentrate was charged into a jacketed glass-lined reactor. Concentrated (i.e. 98%) sulfuric acid was added gradually while heating the charge to 110° C. until the evolution of HBr began; this was conducted to the hydrobromination vessel, through a dephlegmator to return aqueous hydrobromic acid to the generator, and through a bromine trap. The operation according to the process of Example I was carried out, and the rate of hydrogen bromide production was controlled by varying the rate of addition of sulfuric acid and the rate of heating of the generator, up to 130° C. Make up bromide was added as required from a reserve store to ensure completion of the hydrobromination.

When the reaction with olefin was complete, the generator was heated further to about 150° C. and under gradually reduced pressure, to about 26 inches of vacuum. A quantity of hydrogen bromide as aqueous solution was recovered and set aside for reuse.

The overall materials balance indicated 95% recovery of the bromide charged per batch.

Sodium or potassium bromide may be used instead of calcium bromide.

From the residue, after cooling, a part of the sulfuric acid at about 70% concentration may be recovered by means of a solid-bowl centrifugal. The metal sulfate or bisulfate cake is discarded.

Instead of concentrating the bromide brine, it may be spray—or tunnel—dried, for addition to recovered 70% sulfuric acid; make up acid thereafter required would be of 98% grade.

Example IX

A continuous countercurrent Pyrex reactor was constructed, the reaction chamber consisting of a Graham condenser with 17 coils and about 40 cm. in length. The top of the column was fitted with a T to admit a dropping funnel for the charge, and a vent for effluent gas. The bottom of the column contained a gas dispersion tube for admitting HBr gas from a cylinder, and a stopcock for removing the product.

The jacket was cooled with circulated isopropanol at $-5°$ to $-10°$ C.

1-dodecene was charged into the dropping funnel, plus 0.25 volume percent of a 60% solvent solution of methyl ethyl ketone peroxide. The coils were filled with the dodecene which was allowed to chill; HBr gas was then passed in countercurrently at a rate less than enough to bubble out at the top. The rates of addition of charge and of efflux of product were regulated to maintain the column full at all times, and to remove the product at an optimum rate.

At a throughput of 94 ml. per hour, the effluent assayed more than 99% as alkyl bromide, containing about 94% of 1-bromododecane.

For ease of control, we prefer to use HBr generated by burning hydrogen and bromine with this system.

Example X

In the continuous countercurrent reactor of Example IX, decene and $C_{11}$ to $C_{14}$ olefins were hydrobrominated in the same manner.

Example XI

The continuous hydrobromination as described in Examples IX and X was also carried out, substituting benzoyl peroxide for methyl ethyl ketone peroxide, using about 0.5% on the weight of the olefin, with equally good results, approaching or attaining 100% conversion.

Example XII

The continuous, countercurrent reactor of Example IX was used for the hydrobromination without the addition of a peroxide catalyst, but instead by irradiating the column with a Hanovia ultraviolet lamp.

At a throughput of 76.5 ml. per hour, 1-dodecene yielded a bromide of 98.5% conversion.

Example XIII

In the same manner as in Example XII, 1-octadecene was irradiated at 19° to 22° C. to 99% conversion to the bromide; hexadecyl bromide was obtained in 99.5% yield at 5° to 19° C., and tetradecyl bromide in 100% yield at about 6° C., without solidification, from the corresponding alpha olefins. All cited temperatures are in the cooling liquor in the jacket.

1-hexadecene-1-octadecene mixture was reacted with hydrogen bromide in the same manner. $C_{20}$ to $C_{24}$ olefins were also reacted, at a temperature of about 25° C.

Example XIV

The alkyl bromides obtained in the above examples were reacted with diethyl amine instead of dimethyl amine. Reaction was complete within six hours, yielding the corresponding alkyl diethyl amines.

Example XV

The alkyl bromides as obtained in Examples I to III and IX to XIII were reacted with diethanolamine for six hours to yield the corresponding alkyl diethanolamines.

Example XVI

The alkyl bromides as obtained in Examples I to III and IX to XIII were reacted with morpholine for a period of about eight hours to yield the corresponding N-alkyl morpholines.

Example XVII

One mol of the $C_{14}$ to $C_{16}$ alkyl bromide of Example I was reacted for six hours at 110° C. in a pressure vessel with about eight mols of 30% monomethyl amine in isopropanol. The excess methyl amine and the alcohol were stripped off, and one mol of caustic soda solution was added to form sodium bromide and $C_{14}$ to $C_{16}$ alkyl methyl amine. Further methyl amine was distilled off.

To the residual charge, a second mol of the alkyl bromide was added in an equal volume of isopropanol, and the heating was continued for a further period of hours. The alcohol was stripped off and the product was treated with one mol of aqueous caustic to neutralize the hydrobromide.

The combined brines were segregated for recovery as hydrogen bromide. The product obtained was di($C_{14}$ to $C_{16}$ alkyl) methyl amine.

In a similar manner, the alkyl bromides from Examples II, III, IX, X and XIII were converted to the corresponding di-alkyl methyl amines.

Example XVIII

The distilled $C_{14}$ to $C_{16}$ alkyl dimethyl amine of Example IV was titrated with standard acid and was found to have a combining weight of 257 (theory=250).

One hundred and thirty-one grams or 0.51 mol of the amine were reacted with 83.3 grams or 0.50 mol of benzyl chloride in 215 grams of water by heating to 90° C. for one hour, at the end of which time the reaction was complete as determined by argentometric titration. The solution was 50.5% in concentration as $C_{14}$ to $C_{16}$ alkyl dimethyl benzyl ammonium chloride.

The product was tested bacteriologically by the Official Phenol Coefficient Method of the United States Department of Agriculture, against *Salmonella typhosa* and *Staphylococcus aureus*.

For comparison, a sample of "BTC–824," an alkyl dimethyl benzyl ammonium chloride in which the alkyl distribution is 60% $C_{14}$, 30% $C_{16}$, 5% $C_{12}$ and 5% $C_{18}$, was tested in the same manner. They compared as follows:

| Sample | Phenol Coefficient at 20° C. vs. | |
| --- | --- | --- |
|  | S. aureus | S. typhosa |
| Example XVIII | 875 | 584 |
| BTC-824 | 900 | 544 |

Each exhibited a hard water tolerance of 550 parts per million by the Chambers modification of the Weber and Black method (vide George F. Reddish, "Antiseptics, Disinfectants, Fungicides, and Chemical and Physical Sterilization," 2nd edition (1957), page 185).

Example XIX

The distilled $C_{14}$–$C_{16}$ alkyl dimethyl amine used in Example XVIII was reacted in stoichiometric proportion with chloro acetic acid.

Three parts by weight of the acid and one part of propylene glycol were agitated in a three-neck flask while the amine was added gradually. The temperature rose sharply to 55° C. The mixture was heated further to about 80° C., when the reaction became strongly exothermic and it was necessary to apply cooling to hold a temperature of 100° to 110° C. This temperature was maintained for three hours, at the end of which time argentometric titration indicated that the reaction was 95% complete.

The product, the hydrochloride of $C_{14}$–$C_{16}$ alkyl dimethyl betaine, was then neutralized in a second agitated flask containing two equivalents of caustic soda in aqueous solution, to which it was added while agitating and cooling. The final product, which is the sodium salt, had a pH of 6.0. It is an effective foaming and wetting agent, and is amphoteric in character, containing both a carboxyl and a quaternary ammonium group.

Example XX

One hundred grams of the distilled $C_{14}$–$C_{16}$ alkyl dimethyl amine of Example IV was dissolved in 100 grams of isopropanol and 50 grams of water in an agitated flask equipped with a reflux condenser and a dropping funnel charged with 50% hydrogen peroxide. The solution was heated to 40° C., and 34 grams of hydrogen peroxide was added while the temperature was maintained between 40° and 80° C. by cooling and heating as required. The reaction was continued for several hours until the mixture first became homogeneous and then gave a clear solution in water. Heating was continued until the excess hydrogen peroxide was decomposed. The solution was diluted with water to 15% strength as $C_{14}$–$C_{16}$ alkyl dimethyl amine oxide.

Tested at 1.0% and at 0.1% concentration, the product showed excellent foam stability when tested by methods well known to the art.

Example XXI

A mixture of two parts of di-octadecyl methyl amine and one part of di-hexadecyl methyl amine obtained by the method of Example XVII was quaternized with dimethyl sulfate as follows, for the purpose of preparing a fabric softener. 64 parts by weight of the amines, 20 parts of isopropanol, 5 parts of water and 3 parts of sodium bicarbonate were heated together with agitation at 80° C., and the theoretical amount, about 15 parts of dimethyl sulfate was added slowly; the temperature was maintained at 80° to 100° C. until the reaction was essentially complete, as evidenced by the decrease in titrable amine.

The mixture was cooled to 60° C. and was filtered to clarify it. Water was added to adjust the concentration to 75% as di-($C_{16}$–$C_{18}$ alkyl) dimethyl ammonium methosulfate, by Epton titration.

The product was tested against similar, commercial household softeners of the di(hydrogenated tallow) dimethyl ammonium chloride or methosulfate type and found to be at least as effective, when applied to unfinished terry cloth toweling in the final rinse in a household automatic washing machine. In each case the amount of softener used was sufficient to deposit 750 parts per million on the weight of the fabric by total exhaustion.

Instead of dimethyl sulfate, methyl chloride or diethyl sulfate may be used as the quaternizing agent.

The above examples have been cited to describe the invention and are not intended to limit it. It has been shown that alpha olefins, whether derived from petroleum, as by thermal cracking of waxes, or synthetically by the condensation of ethylene, or otherwise, have been reacted with hydrogen bromide catalytically under suitable conditions to yield alkyl bromides which are almost entirely 1-bromides; that this reaction is feasible either in batch or continuous processes; that by virtue of skillful and ingenious cycling and recycling, bromine or hydrogen bromide may be employed to this end with a very minimum of loss and therefore of cost except for process handling; and that such cycling is not only efficient but almost totally devoid of the nuisance or hazard of toxic or corrosive fumes.

It has also been shown that the alkyl bromides so obtained are of excellent quality. It has further been demonstrated that the useful and valuable tertiary amines obtained therefrom compare favorably with similar but relatively more costly amines such as may be and are derived from fatty alcohols or fatty acids by involved processes. It has also been shown that the said amines can be prepared from the bromides with ease and that in their preparation only a very small amount of the required excess of reactants and solvents is left unrecoverable.

The process of this invention is therefore a novel, useful and economical one for synthesizing products of commercial utility and value, and most important from the commercial viewpoint, at low cost and in a compact plant.

We claim:

1. The process of making straight chain alkyl tertiary amines which comprises the steps of reacting a straight chain alpha olefin having 6 to 24 carbon atoms, in liquid phase, with anhydrous hydrogen bromide to form 1-bromo alkane, reacting the 1-bromo alkane, in liquid phase, with an excess of an amine selected from the group consisting of monoalkyl amine, dialkyl amine and dihydroxyalkyl amine to form a tertiary amine hydrobromide, treating the tertiary amine hydrobromide with a metal hydroxide solution to liberate the free tertiary amine and form bromide salts, recovering the bromide salts and producing hydrogen bromide therefrom for reacting same with additional straight chain alpha olefin.

2. The process of making straight chain alkyl tertiary amines as defined in claim 1 wherein the recovered bromide salts are reacted with sulfuric acid to form anhydrous hydrogen bromide and reacting said hydrogen bromide with additional straight chain alpha olefin.

3. The process of making straight chain alkyl tertiary amines as defined in claim 1 wherein the aqueous solution of recovered bromide salts is reacted with chlorine to generate free bromine, reacting the bromine with hydrogen to form anhydrous hydrogen bromide, and reacting said hydrogen bromide with additional straight chain alpha olefin.

4. The process of making straight chain alkyl tertiary amines as defined in claim 1 wherein the 1-bromo alkane is reacted with an excess of dimethyl amine at a temperature from 100° to 250° C. over a period of 1 to 10 hours, in the presence of a polar solvent and recovering unreacted dimethyl amine for reuse in the process.

5. The process of making straight chain alkyl tertiary amines as defined in claim 1 wherein the alpha olefin is selected from the group of 1-octene, 1-decene, 1-dodecene, 1-hexadecene, 1-octadecene, 1-tetradecene, an alpha olefin derived from the dehydration of primary alcohols of $C_{20}$ to $C_{24}$ chain length, a petroleum derived mixture of alpha olefins having $C_{11}$ to $C_{14}$ chain lengths, and mixtures thereof.

References Cited

UNITED STATES PATENTS

| 3,401,203 | 9/1968 | Kraiman et al. | 260—583 |
| 2,078,582 | 4/1937 | Nafash. | |
| 2,172,822 | 9/1939 | Tamele et al. | |

OTHER REFERENCES

Groggins, Unit Processes in Organic Synthesis, McGraw-Hill, New York, third edition (1947), pages 227 and 228.

CHARLES B. PARKER, Primary Examiner

R. L. RAYMOND, Assistant Examiner

U.S. Cl. X.R.

260—663